United States Patent [19]

Harris et al.

[11] 4,089,796

[45] * May 16, 1978

[54] TREATMENT OF WATER OR AQUEOUS SYSTEMS

[75] Inventors: Arthur Harris, Stockport; John Burrows, Congleton; Thomas Ivor Jones, Poynton, all of England

[73] Assignee: Ciba-Geigy Corporation, Ardsley, N.Y.

[*] Notice: The portion of the term of this patent subsequent to Jun. 15, 1993, has been disclaimed.

[21] Appl. No.: 695,345

[22] Filed: Jun. 14, 1976

Related U.S. Application Data

[60] Continuation-in-part of Ser. No. 575,690, May 8, 1975, Pat. No. 3,963,636, which is a division of Ser. No. 312,019, Dec. 4, 1972, Pat. No. 3,897,209.

[30] Foreign Application Priority Data

Dec. 10, 1971 United Kingdom .............. 57413/71

[51] Int. Cl.² ........................... C02B 5/02; C02B 5/06

[52] U.S. Cl. .................................... 252/181; 252/148; 252/175; 252/87; 252/387; 252/389 R; 252/396; 252/8.55 E; 21/2.5 R; 21/2.7 R; 210/58

[58] Field of Search ................... 252/181, 389 R, 175, 252/396, 148, 387, 87, 8.55 E; 21/2.5 R, 2.7 R; 210/58

[56] References Cited

U.S. PATENT DOCUMENTS

| 3,794,603 | 2/1974 | O'Neal, Jr. et al. ............. 252/389 R |
| 3,963,636 | 6/1976 | Harris et al. ......................... 252/181 |

*Primary Examiner*—Mayer Weinblatt
*Attorney, Agent, or Firm*—Luther A. R. Hall

[57] ABSTRACT

Compositions for inhibiting corrosion and scale formation in aqueous systems which consist essentially of from 20 to 97.5% by weight of total composition of (a) a combination of zinc and hydrolyzed polymaleic anhydride and (b) 2.5 to 80% by weight of total composition of a corrosion inhibitor, particularly benzotriazole.

7 Claims, No Drawings

TREATMENT OF WATER OR AQUEOUS SYSTEMS

This is a continuation-in-part of application Ser. No. 575,690 filed on May 8, 1975, now U.S. Pat. No. 3,963,636, which is a division of application Ser. No. 312,019, filed on Dec. 4, 1972, now U.S. Pat. No. 3,897,209.

The present specification relates to the treatment of water or aqueous systems.

In very general terms, water and aqueous systems can be divided into two categories, those which may be said to be scale-forming and those which may be said to be corrosive. If a water is scale-forming, it will tend to deposit scale on metal heat-transfer surfaces in contact with it; such a water will not normally be corrosive, but in any case the scale deposited will protect the metal to some extent from corrosive attack. If a scale-forming water is treated in such a way as to alter its properties, for example by change of pH, then it may well become corrosive. In most cases, therefore, additives for water treatment tend to fall under the heading of anti-scalants or corrosion inhibitors. Some waters or aqueous systems however are both scale-forming and corrosive, and there is thus a need for an additive treatment which reduces both scale-formation and corrosive attack.

One type of anti-scaling additive is known as a threshold agent; such agents are products which can be added to water or aqueous systems in very small quantities, very much less than stoichiometric quantities, and which then cut down the rate at which insoluble salts are formed, and also modify their nature so that they do not deposit so readily as adherent scale in processes involving heat-transfer. Furthermore, when any such scale is formed, it is easily removeable from heat-transfer surfaces by mechanical means. A number of additives have been proposed for addition to water or aqueous systems in this way, among them certain polyphosphates, and polycarboxylic acids, such as polyacrylic acid and polymethacrylic acid.

It is known that combinations of some threshold agents with sources of zinc ions such as zinc salts, will reduce both scale formation and corrosive attack of water or aqueous systems on metal surfaces. However, the only specific classes of compounds disclosed as threshold agents in such combinations have been polyphosphates or organic phosphonic acids; no mention has been made of polycarboxylic acids, because the common ones, such as polyacrylic acid and polymethacrylic acid are not effective corrosion inhibitors alone nor are they active in combination with zinc ions. We have now found, however, that one type of polycarboxylic acid, which we call hydrolysed polymaleic anhydride, does form a synergistic combination with zinc ions.

According to the present invention there is provided as process for inhibiting the corrosion and scale forming tendencies of water or an aqueous system which comprises treating the water or aqueous system with from 0.1 to 500 p.p.m. of an additive combination comprising from 2.5 to 80% by weight of zinc (calculated as $Zn^{++}$) and from 97.5 to 20% by weight of hydrolysed polymaleic anhydride, or of a water soluble salt of such hydrolysed polymaleic anhydride.

Polymaleic anhydride is a known material, and may be prepared by a number of routes of polymerisation. British Patent Specification No. 1,024,725, for example, describes a process for the manufacture of polymaleic anhydride, wherein maleic anhydride is dissolved in an inert organic solvent and polymerised under the action of a free radical polymerisation catalyst, and British Patent Specification No. 1,193,146 describes a method of producing polymaleic anhydride at a high yield in which maleic anhydride is polymerised at 70° to 120° C. for at least 3 hours by using toluene as solvent and 0.02 to 0.2 mols. of benzoyl peroxide as polymerisation initiator per mol. of the fed maleic anhydride.

Polymerised maleic anhydride, prepared in these or other ways, may be hydrolysed very readily, for example by heating with water, to form a polymeric product which contains free carboxylic acid groups, and possibly some residual anhydride groups, on a carbon backbone; the product is not pure polymaleic acid. The actual structure of the product is not known yet, and so this type of polymeric product formed by hydrolysing polymerised maleic anhydride will be referred to in this specification as hydrolysed polymaleic anhydride.

In our copending Application No. 202,628, now U.S. Pat. No. 3,810,834, we describe and claim a process in which water or an aqueous system is treated with from 0.1 to 100 parts per million by weight, calculated on the water or aqueous system, of hydrolysed polymaleic anhydride (as defined) having a molecular weight of 300 to 5,000 as determined by calculation following osmometric measurements on the polymaleic anhydride before hydrolysis, or of a water soluble salt of such hydrolysed polymaleic anhydride. We said that the material referred to as hydrolysed polymaleic anhydride is prepared from polymer obtained by the addition polymerisation of a monomer feed consisting essentially of maleic anhydride, under bulk or solution polymerisation conditions. The main chain of the initial polymer is substantially formed of non-hydrolysable linkages. The initial unhydrolysed polymer product, when free of unreacted monomer and other non-polymeric molecular species, has a molecular weight of between 300 and 5000 measured in dioxan solution by a vapor pressure osmometer, and is subsequently hydrolysed by water or a water-soluble alkali, either before use or by the act of incorporation into the water to be treated.

Decarboxylation of the polymer may occur during polymerisation of subsequent hydrolysis, so that the acid value of the hydrolysed polymaleic anhydride is found to be lower than the theoretical value of 956 mgm KOH per gram, but such decarboxylation does not proceed to such an extent that the acid value falls to below 350 mgm KOH per gram. The acid value is determined by potentiometric titration in aqueous solution against 0.1 potassium hydroxide solution, the end point being taken as the highest peak on the plot of $\Delta pH/\Delta V$ against V where $\Delta pH$ is the change of pH, $\Delta V$ is the change in volume and V is the volume of titre.

In general terms, the preparations of hydrolysed polymaleic anhydride of particular value in this invention may be characterised by the formula:

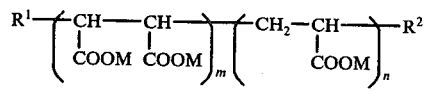

ps where $R^1$ and $R^2$ are hydrogen, radicals derived from the solvent in which the polymerisation was effected or radicals derived from the catalyst used, and $m + n$ must be at least 2 and not exceed about 50 and such as to give the required molecular weight of from 300 to 5000, the value of $m$ being at least 10 times the value of $n$. $R^1$ and $R^2$ may be the same or different and may be hydrogen. $C_6H_5$—$CH_2$— radicals (derived from toluene solvent), $CH_3$—$C_6H_4$—$CH_2$— radicals (derived from xylene solvent), $C_6H_5$— radicals (derived from benzene solvent or benzoyl peroxide catalyst) or $(CH_3)_3C$— radicals (derived from tertiary butyl peroxide catalyst). M is hydrogen or any metal atom such that the salt formed is water-soluble.

Since the present invention concerns particularly corrosion-prevention, and protection against scale formation is of somewhat lesser importance, there is no special limitation to low molecular weights of hydrolysed polymaleic anhydride; it will however be advantageous to use the overall range of 300 to 5000 with a preference for values not exceeding 2000.

The molecular weight of the hydrolysed polymaleic anhydride is not readily available by direct measurement, but is easily derived from that of the polymerised maleic anhydride before hydrolysis. For example, if the molecular weight of a polymerised maleic anhydride is 800, (as measured, for example, in dioxan solution using a vapour pressure osmomometer sold under the Trade Mark Mechrolab 301 A) and each molecule contains seven units of anhydride, the theoretical molecular weight of the hydrolysed polymaleic anhydride prepared from it will be 800 + (7 × 18), that is 926.

Since polymerised maleic anhydride is so readily hydrolysed, as previously indicated, to form hydrolysed polymaleic anhydride, treatment of water or an aqueous system with polymerised maleic anhydride is the same as treatment with hydrolysed polymaleic anhydride.

Therefore the present invention includes the use of such proportion of polymerised maleic anhydride as will yield the desired amount of hydrolysed polymaleic anhydride on hydrolysis.

The zinc ion may be added as any of the water soluble salts of zinc, e.g., zinc borate, chloride, nitrate or sulphate.

Normally the amount of additive combination used will lie between 1 and 200 p.p.m., calculated on the water or aqueous system.

The synergistic effect now discovered is obtained using an additive combination consisting of from 2.5 to 80% by weight of zinc and from 97.5 to 20% by weight of hydrolysed polymaleic anhydride. Preferably, however, the combination will consist of from 10 to 60% by weight of zinc and from 90 to 40% by weight of hydrolysed polymaleic anhydride. Such additive combinations per se are novel and constitute part of the invention.

Hydrolysed polymaleic anhydride (or its precursor polymerised maleic anhydride) with zinc may be used in conjunction with other conventional water-treatment additives as desired. Specifically the combination may be used with other common inhibitors, for example those used for protection of copper such as benzotriazole and bis-benzotriazole or copper-deactivating derivatives of these compounds; or a silicate to control attack on aluminium. In addition there may also be added other corrosion inhibitors for ferrous metals known per se, e.g. chromium or nitrite ions or amines.

Combinations of inhibitors according to the present invention contain from about 20 to 97.5%, more preferably from about 40 to 97.5%, and most preferably from about 75 to 95%, by weight of (a) hydrolyzed polymaleic anhydride and zinc (calculated as $Zn++$) and from about 2.5 to 80%, more preferably from about 2.5 to 60%, and most preferably from about 5 to 25%, by weight, of (b) the other corrosion inhibitor or inhibitors, especially a silicate, chromium or nitrite ions or an amine, or benzotriazole, bis-benzotriazole or copper-deactivating derivatives of these benzotriazoles. A benzotriazole, bis-benzotriazole or copper-deactivating derivative of these benzotriazoles constitutes a particularly useful co-additive, especially benzotriazole.

The portion of the above additive combination which consists of zinc and hydrolyzed polymaleic anhydride consist of from 2.5 to 80%, preferably from 10 to 60%, by weight of zinc and from 97.5 to 20%, preferably from 90 to 40%, by weight of hydrolyzed polymaleic anhydride.

Normally, the total amount of the above additive combination (a) of hydrolyzed polymaleic anhydride, zinc and of (b) the other additive or additives used according to the invention will be within the range of from 0.1 to 500 ppm, preferably from 1 to 200 ppm., of the aqueous system.

The invention will be illustrated with reference to the following Examples:

EXAMPLES 1 – 13

Some laboratory corrosion tests were carried out to show the synergistic effect of combining hydrolysed polymaleic anhydride and zinc, and to show that hydrolysed polymaleic anhydride is the only common polycarboxylic acid which gives this synergistic effect. The test method is referred to as the Aerated Solution Bottle Test.

In each of these tests, and in the Laboratory Heat Exchanger Rig Tests to be subsequently described, the hydrolysed polymaleic anhydride was prepared as follows:

250 parts of maleic anhydride were dissolved in 500 parts of toluene by heating to 70° C. To this solution was added a solution of 71.5 parts benzoyl peroxide (70% paste in dimethyl phthalate) in 250 parts of toluene over 30 minutes. The solution was heated to 90° C. and maintained there for 5 hours; during this time the polymer precipitated from the solution. Some of this polymer was isolated and found to have a molecular weight of 470 approximately by osmosis.

150 parts of water were added slowly at 60° C. to the solution/precipitated polymer and the mixture stirred for 1 hour. On stopping the stirrer, a separation of the mixture into two layers was obtained. The upper toluene layer was removed and the aqueous solution was stripped under reduced pressure, to remove traces of toluene. The product was a brown coloured solution of hydrolysed polymaleic anhydride with a solids content of about 70% by weight, the polymer having a calculated molecular weight of 560.

To carry out the Aerated Solution Bottle Test, a standard corrosive water is made up from:
20g. $CaSO_4 \, 2H_2O$
15g. $MgSO_4 \, 7H_2O$
4.6g. $NaHCO_3$
7.7g. $CaCl_2 \, 6H_2O$
45 gallons Distilled water Mild steel coupons, 5 cms. × 2.5 cms are scrubbed with pumice, immersed for one minute in hydrochloric acid and then rinsed, dried and weighed.

The desired proportion of additive combination is dissolved in 100 ml. of standard corrosive water. a steel coupon is suspended in the solution, and the whole is stored in a bottle in a thermostated water bath at 22° C.

During the storage period, air is passed into the solution at 500 ml/minute, the passage of the air being screened from the steel coupon; any water losses by evaporation are replaced as they occur with distilled water from a constant head apparatus.

After 48 hours, the steel coupon is removed, scrubbed with pumice, immersed for one minute in hydrochloric acid inhibited with 1% by weight of hexamine and then rinsed, dried and reweighed. A certain loss in weight will have occurred.

The test results are expressed as a weight loss in milligrams, and are given in Table 1 below. In each case, $Zn^{++}$ was added as zinc nitrate hexahydrate, and the polyacrylic acid, and polymethacrylic acid had molecular weights respectively of 20,000 and 15,000.

TABLE 1

TEST RESULTS AT 100 P.P.M. OF ADDITIVE COMBINATION COMPARED WITH A BLANK

| Example | Relative Proportions | | Weight Loss In Milligrams With Specified Polycarboxylic Acid | | |
|---|---|---|---|---|---|
| | Zinc | Polycarboxylic acid | Polyacrylic acid | Polymethacrylic acid | Hydrolysed polymaleic anhydride |
| — | 0 | 0 | 99.0 | 99.0 | 99.0 |
| — | 100 | 0 | 66.5 | 66.5 | 66.5 |
| — | 90 | 10 | 51.5 | 62.0 | 33.0 |
| 1 | 80 | 20 | 50.0 | 61.5 | 17.4 |
| 2 | 75 | 25 | — | — | — |
| 3 | 70 | 30 | 48.0 | 56.5 | 4.2 |
| 4 | 60 | 40 | 56.5 | 50.0 | 3.0 |
| 5 | 50 | 50 | 54.5 | 50.5 | 3.0 |
| 6 | 40 | 60 | 39.0 | 59.0 | 3.6 |
| 7 | 30 | 70 | 59.0 | 56.0 | 6.0 |
| 8 | 25 | 75 | — | — | 7.5 |
| 9 | 20 | 80 | 60.0 | 56.0 | 4.8 |
| 10 | 15 | 85 | — | — | 4.0 |
| 11 | 10 | 90 | 55.5 | 56.5 | 6.0 |
| 12 | 5 | 95 | — | — | 19.5 |
| 13 | 2.5 | 97.5 | — | — | 20.0 |
| — | 0 | 100 | 58.0 | 57.0 | 32.0 |

EXAMPLES 14 – 16

Some laboratory tests were carried out using a Laboratory Heat Exchanger Rig, a form of laboratory testing intended to simulate practical use conditions more closely than does the Aerated Solution Bottle Test described in Examples 1 – 13. In this rig, corrosive water is aerated and circulated over a number of metal coupons, and is heated by being passed through a heated steel heat exchanger tube. After a suitable test period, the metal coupons and the heat exchanger tube are examined, and their state assessed.

In detail, the rig consists of a closed water circuit, made up of the following items in order,
2 liter reservoir
1 liter reservoir
flow meter
coupon chamber
heat exchanger
cooling condenser Corrosive water in the 2 liter reservoir is aerated with compressed air introduced through a sintered disc at about 5 liters per minute, and is then pumped to the 1 liter reservoir. From this reservoir it is pumped through the flow meter to the glass coupon chamber in which are a number of rectangular metal coupons each 2.5 by 5.0 cms. mounted on a perspex jig. The water then flows through the heat exchanger which is made up of a ⅜ inch internal diameter steel tube with copper end pieces around which is wound a 960 watt heater coil; from the heat exchanger the water flows through the cooling condenser back to the 2 liter reservoir.

A flow rate in the circuit of about 1.0 gallon per minute provides a velocity of about 1.5 feet per second and a Reynolds number of 8500 in the heat exchanger. The heater coil gives the heat exchanger tube a skin temperature of about 60° C. and the water leaves at about 45° C., a difference across the heat transfer surface of some 15° C. The cooling condenser is so operated as to cool the water to about 35° C. before it begins a fresh circuit.

Metal coupons are scrubbed with pumice and then immersed in acid as follows:

| metal | acid |
|---|---|
| mild steel | Conc. HCl diluted 1:1 with water at room temperature for 1 minute |
| copper | " |
| brass | " |
| aluminium | 5% phosphoric acid/2% chromic acid, at 75° C. for 5 minutes |

After such immersion, the coupons are rinsed with water, dried and weighed; they are then mounted on a perspex jig, care being taken to ensure that none of the coupons touch each other, and that they are insulated from the bolt holding the jig together. The heat exchanger tube is cleaned with pumice, dipped in conc. hydrochloric acid diluted 1:1 with water, and then rinsed in water and dried.

The rig is assembled, and cleaned thoroughly by circulating conc. hydrochloric acid diluted 1:1 with water, then flushing with tap water for about half an hour (about 30 gallons in all) and draining. The necessary quantity of additives to produce the desired concentrations is put into one of the reservoirs and the rig is filled with 4.5 liters of a standardised corrosive test water, which is characterised as follows:

| | | |
|---|---|---|
| Phenol Alkalinity | 0 | as p.p.m. of $CaCO_3$ |
| Total Alkalinity | 110 | |
| Temp. Hardness | 203 | |
| Perm. Hardness | 83 | |
| Total Hardness | 286 | |
| Chloride | 35 | p.p.m. |
| Total Dissolved Solids | 310 | p.p.m. |

The pump is primed and started, and the heater switched on.

The concentration of inhibitor and the water level in the rig are checked daily and any losses made good.

After a standard period of ten days, the heat exchanger tube is removed, sectioned and examined. The test coupons are removed and the mild steel, brass and copper coupons are cleaned as before except that the acid is inhibited with 1% hexamine, rinsed, dried and reweighed. The aluminium specimens are scrubbed, dried and re-weighed. The results observed enable an assessment to be made of the anti-scaling and anti-corrosive action of the inhibitor under test.

The following additives were tested, all parts and proportions being by weight:

| Example | Additives and Concentration |
|---|---|
| A | None |
| B | 100 p.p.m. Zinc Polyphosphate 10.7% ZnO 57% $P_2O_5$ 32.3% $Na_2O$ |
| 14 | 80% Hydrolysed Polymaleic Anhydride |

-continued

| Example | Additives and Concentration | |
|---|---|---|
| 15 | 100 p.p.m. of | 15% $Zn^{++}$<br>5% Benzotriazole<br>68% Hydrolysed Polymaleic Anhydride |
| 16 | 100 p.p.m. of | 22.6% $Zn^{++}$<br>9.4% Benzotriazole<br>32% Hydrolysed Polymaleic Anhydride |
| | 200 p.p.m. of | 45.5% $Zn^{++}$<br>22.5% Benzotriazole |

In each case the $Zn^{++}$ was added as zinc nitrate hexahydrate. The following results were obtained:-

CORROSION RATE OF METAL COUPONS
mg. per sq. decimetre per day (m.d.d.)

| Example | Mild Steel | Copper | Brass | Aluminium | Condition of Heat Exchanger Tube |
|---|---|---|---|---|---|
| A | 90.4 | 0.9 | 1.6 | 92.4 | Dense red corrosion deposit |
| B | 52.5 | 1.2 | 2.7 | 14.0 | Thick deposit of white scale |
| 14 | 2.8 | 2.6 | 2.2 | 0.0 | Even grey film - no corrosion |
| 15 | 7.4 | 0.0 | 0.0 | 0.0 | Greyish-green film - Some small patches of scaling corrosion |
| 16 | 6.5 | 0.0 | 0.0 | 0.0 | White film - Some small patches of corrosion |

There are no official specification limits for pass or failure in this test. In our own assessments, we consider that corrosion rates above 8.0 m.d.d. for mild steel, 5.0 m.d.d. for copper, 5.0 m.d.d. for brass and 4.0 m.d.d. for aluminium are unacceptable; it can therefore be seen that the combinations of additives according to the invention used in Examples 14, 15 and 16 give satisfactory results.

EXAMPLE 17

A four week field trial of the composition of Example 14 was carried out in a hydrostatic cooker of the type used in the food processing industry to sterilise and cook canned foods.

The cans are carried through the cooker on mild steel bars which are mounted at each end on a continuous chain. The chain loops up and down through a preheat leg where the cans are contacted with hot water through a steam chamber and finally through a cooling leg before being spray cooled. The total process time varies between 10 and 60 minutes, and the temperature in the cooker ranges from 90° – 212° F.

A typical analysis of the water used in the cooker was as follows:

| | | |
|---|---|---|
| pH | 8.2 | |
| Phenol alkalinity | 0 | as p.p.m. $CaCO_3$ |
| Total alkalinity | 190 | |
| Total hardness | 310 | |
| Chlorides | 140 | p.p.m. |
| Total dissolved solids | 1,000 | p.p.m. |

Severe corrosion of the cooker parts, particularly the carrier bars and chain, had been experienced due to the high temperature and the aggressive nature of the water.

For 2 weeks the cooker was treated, at a concentration of 100 p.p.m., with a zinc polyphosphate composition comprising:
10.7% ZnO
57% $P_2O_5$
32.3% $Na_2O$ The corrosion rates, measured using a polarisation resistance technique, in the cooker and associated cooling system were as follows:

| | Corrosion rate (m.p.y.) | |
|---|---|---|
| | Cooker | Cooling System |
| Week 1 | 13.0 | 15.5 |
| Week 2 | 10.5 | 5.5 |

Following this treatment the cooker was drained and refilled with water which was treated with 60 p.p.m. of a composition comprising:
80% hydrolysed polymaleic anhydride
15% $Zn^{++}$ (added as $Zn(NO_3)_2 \cdot 6H_2O$)
5% benzotriazole The corrosion rates, measured as before, were as follows:

| | Corrosion rate (m.p.y.) | |
|---|---|---|
| | Cooker | Cooling System |
| Week 1 | 10.5 | 4.0 |
| Week 2 | 9.0 | 3.5 |
| Week 3 | 3.0 | 5.0 |
| Week 4 | 4.5 | 4.5 |

We claim:

1. A composition for inhibiting the corrosion and scale forming tendencies of water or an aqueous system consisting essentially of
   (a) from 20 to 97.5% by weight of the total composition of an additive combination which consists of from 2.5 to 80% by weight of zinc (calculated as $Zn^{++}$) and from 97.5 to 20% by weight of hydrolysed polymaleic anhydride, having an average molecular weight of from 300 to 5,000, or of a water soluble salt of such a hydrolysed polymaleic anhydride, and
   (b) from 2.5 to 80% by weight of the total composition of at least one corrosion inhibitor selected from the group consisting of a benzotriazole and a bis-benzotriazole.

2. A composition according to claim 1, wherein corrosion inhibitor (b) is benzotriazole.

3. A composition according to claim 1, wherein additive combination (a) consists of from 10 to 60% by weight of zinc and from 90 to 40% by weight of hydrolysed polymaleic anhydride or a water soluble salt thereof.

4. A composition according to claim 1, consisting essentially of from 75 to 95% by weight of additive combination (a) and from 5 to 25% by weight of corrosion inhibitor (b).

5. A composition according to claim 1, wherein the hydrolysed polymaleic anhydride or the water soluble salt thereof has a molecular weight not exceeding 2,000.

6. A composition according to claim 1, wherein the amount of (a) plus (b) is from 0.1 to 500 ppm. calculated on the water or aqueous system.

7. A composition according to claim 1, wherein the amount of (a) plus (b) is from 1 to 200 ppm. calculated on the water or aqueous system.

* * * * *